United States Patent [19]

Kinoshita et al.

[11] 4,239,542

[45] Dec. 16, 1980

[54] WATER-SOLUBLE FLAME RETARDER AND PROCESS FOR PREPARING THE SAME

[75] Inventors: Tsukuru Kinoshita; Shuji Masuda, both of Tokushima; Tetuo Hasegawa, Naruto, all of Japan

[73] Assignee: Otsuka Chemical Co., Ltd., Osaka, Japan

[21] Appl. No.: 44,695

[22] Filed: Jun. 1, 1979

[30] Foreign Application Priority Data

Dec. 7, 1978 [JP] Japan ................................ 53-152305

[51] Int. Cl.$^3$ ................................................ C09D 5/18
[52] U.S. Cl. ............................... 106/18.14; 106/18.15; 106/18.16; 106/18.17; 106/18.18
[58] Field of Search ............... 106/18.14, 18.15, 18.16, 106/18.17, 18.18

[56] References Cited

U.S. PATENT DOCUMENTS

| | | | |
|---|---|---|---|
| 3,513,114 | 5/1970 | Hahn et al. | 106/18.15 |
| 3,723,074 | 5/1973 | Sears et al. | 106/18.14 |
| 3,976,752 | 8/1976 | Corver et al. | 423/315 |

OTHER PUBLICATIONS

Chem. Abstr., vol. 79, 55553u, 1973.

*Primary Examiner*—Maurice J. Welsh
*Attorney, Agent, or Firm*—Armstrong, Nikaido, Marmelstein & Kubovcik

[57] ABSTRACT

A water-soluble flame retarder comprising a condensed ammonium phosphate having an average degree of condensation of not more than 60 and a mixture of urea compounds produced from urea in the presence of a condensed ammonium phosphate, the mixture containing biuret and triuret. The flame retarder is advantageously prepared by reacting urea and phosphoric acid in a particular manner to by-produce particular amounts of biuret and triuret.

9 Claims, No Drawings

WATER-SOLUBLE FLAME RETARDER AND PROCESS FOR PREPARING THE SAME

BACKGROUND OF THE INVENTION

The present invention relates to a water-soluble flame retarder and a process for preparing the same. More particularly the invention relates to a water-soluble flame retarder comprising a high condensed ammonium phosphate and a mixture of urea compounds produced from urea in the presence of a condensed ammonium phosphate, and to a process for preparing the water-soluble flame retarder by the condensation reaction of urea and phosphoric acid.

It is well known that a condensed ammonium phosphate is useful as a flame retarder. There are put on the market at present the condensed ammonium phosphates ranging from low condensed ammonium phosphates having a degree of condensation of not more than 6 to high condensed ammonium phosphates. Various processes for preparing condensed ammonium phosphate, e.g. processes by a liquid phase reaction, vapor phase reaction, vapor-liquid phase reaction and vapor-solid phase reaction are known, and at present the condensed ammonium phosphate is generally produced by a vapor phase reaction at a high temperature under a pressure. In these reactions, phosphoric anhydride and gaseous ammonia are mainly employed as the phosphoric acid and ammonia sources, and water, ammonium dihydrogenphosphate, diammonium hydrogenphosphate or phosphorus pentoxide is also employed as auxiliary agents for condensation. In these processes, however, the reaction must be conducted under severe conditions, i.e. at a high temperature under a pressure and causes a problem such as corrosion of apparatus materials. Also, the product is obtained in the form of a mixture of water-soluble low condensed ammonium phosphates and water-insoluble high condensed ammonium phosphates, since it is difficult to control the degree of condensation. Therefore, in case of employing the condensed ammonium phosphate so produced as a flame retarder in a usual treatment manner such as impregnation or coating, troubles arise such as difficulty in preparing an aqueous solution of a flame retarder in concentrations desired in the treatment, ununiformity of impregnation onto the surface and inside a material to be treated and complication of treatment steps. Also, the higher the degree of condensation, the larger the flame retarding effect. However, since the high condensed ammonium phosphate is water-insoluble, the troubles as mentioned above are noticeable particularly when employing a high condensed ammonium phosphate or a condensed ammonium phosphate containing large quantities of a high condensed ammonium phosphate as a flame retarder. Therefore, in the treatment for imparting flame retardancy to fibers, papers, boards, woods and felts in which an aqueous solution of a flame retarder is employed by means of impregnation, coating, spraying, etc., ammonium dihydrogenphosphate, diammonium hydrogenphosphate or a water-soluble condensed ammonium phosphate having a degree of condensation of not more than 4 has been generally employed as a flame retarder.

SUMMARY OF THE INVENTION

It has now been found that slightly water-soluble and water-insoluble condensed ammonium phosphates can be solubilized in water by coexistence of urea compounds produced from urea in the presence of the condensed ammonium phosphates.

According to the present invention, there is provided a water-soluble flame retarder comprising a condensed ammonium phosphate having an average degree of condensation of not more than 60 and 5 to 70 parts by weight, based on 100 parts by weight of the condensed ammonium phosphate, of a mixture of urea compounds produced from urea in the presence of a condensed ammonium phosphate, said mixture containing 50% to 70% by weight of biuret and 20% to 30% by weight of triuret based on the weight of the mixture.

The present invention also provides a process for preparing a water-soluble flame retarder by heating an aqueous solution of phosphoric acid to a temperature of 50° to 100° C., adding urea to the aqueous solution, heating the aqueous solution to a temperature of 110° to 125° C., stopping the heating, continuing the reaction by heat of reaction, and stopping the reaction after 3 to 15 minutes from a second appearance of peaks of temperature of the reaction under heat of reaction, the reaction temperature after stopping the heating being maintained so that the first and second peaks of the reaction temperature which appear after stopping the heating fall within the range of 140° to 150° C.

DETAILED DESCRIPTION

The effective component in the flame retarder of the present invention is a high condensed ammonium phosphate having an average degree of condensation of not more than 60, preferably of 20 to 60 as shown by the following formula:

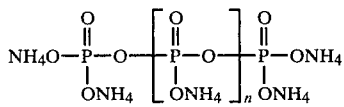

wherein n is from 20 to 60 on an average.

The higher the degree of condensation of the condensed ammonium phosphate, the larger the flame retarding effect, but the poorer the solubility in water. The solubility in water of the condensed ammonium phosphate having the average degree of condensation of 20 to 60 is only about 0.1% to about 6%. According to the present invention, the water solubility of the high condensed ammonium phosphate can be remarkably increased by the presence of urea compounds, and the high condensed ammonium phosphate can be availably employed as a flame retarder in the form of an aqueous solution. The flame retarder of the present invention may contain the condensed ammonium phosphate having a degree of condensation of less than 20, but the high condensed ammonium phosphate having a degree of condensation of not less than 20 is preferred, because of good flame retarding effect. The high condensed ammonium phosphate having a degree of condensation of more than 60 is not dissolved in water and is not desirable.

The term "urea compounds" as used herein means compounds derived from urea, i.e. biuret, triuret and cyanuric acid, and comprehends the unreacted urea.

It is necessary for solubilizing the high condensed ammonium phosphate in water that the urea compounds are those produced in the presence of a condensed ammonium phosphate, and mere addition of the urea compounds to the high condensed ammonium phosphate is hard to make the high condensed ammonium phosphate water-soluble. The essential components in the mixture of the urea compounds produced in the presence of a condensed ammonium phosphate are biuret and triuret, and it is also necessary that the amount of the mixture of the urea compounds is from 5 to 70 parts, preferably 10 to 50 parts by weight based on 100 parts by weight of the condensed ammonium phosphate and moreover the mixture contains 50% to 70% by weight of biuret and 20% to 30% by weight of triuret based on the weight of the mixture. When the amount of the mixture of the urea compounds and the contents of biuret and triuret in the mixture are outside the above ranges, the high condensed ammonium phosphate having an average degree of condensation of 20 to 60 cannot be completely solubilized in water.

The flame retarder of the present invention can be advantageously prepared by employing urea and phosphoric acid as the starting materials in a particular manner in which the urea compounds are by-produced at the same time of the production of the high condensed ammonium phosphate. According to the process of the present invention, the high condensed ammonium phosphate having a uniform degree of condensation can be obtained in the form of an aqueous solution in a simplified manner and by a simplified apparatus as compared with conventional processes.

The flame retarder of the present invention is prepared by heating an aqueous solution of phosphoric acid to a temperature of 50° to 100° C., adding urea to the aqueous solution, heating the aqueous solution to a temperature of 110° to 125° C., stopping the heating, continuing the reaction under heat of reaction, and stopping the reaction after 3 to 15 minutes from a second appearance of the peaks of the reaction temperature ranging from 140° to 150° C.

In the present invention, orthophosphoric acid is usually employed as the phosphoric acid. The phosphoric acid is employed in the form of an aqueous solution containing at least 75% by weight of phosphoric acid, and the concentration of the aqueous solution is selected usually from 75% to 95% by weight, preferably 80% to 85% by weight. When the concentration is less than 75% by weight, the reaction efficiency is low and, therefore, it is desired to concentrate the aqueous solution.

An aqueous solution of phosphoric acid is heated to a temperature of 50° to 100° C., preferably 70° to 90° C. to accelerate the dissolution of urea and to raise the activity of urea phosphate produced at that time. When the temperature is lower than the above range, the added urea aggregates and it becomes impossible to proceed the reaction, since the admixing cannot be sufficiently conducted or becomes impossible. When the temperature is higher than the above range, evaporation of water may occur so as to cause wetting or blocking of urea at the time of adding urea to an aqueous solution of phosphoric acid, and the progress of the reaction is impaired. Also, it is hard to produce the condensed ammonium phosphate having a uniform degree of condensation and moreover it is hard to by-produce the urea compounds in a desired amounts. Therefore, a part of the produced high condensed ammonium phosphate is not dissolved in water.

Urea is added to an aqueous solution of phosphoric acid maintained at a temperature of 50° to 100° C. A granular urea having a particle size of 0.5 to 5 mm., especially 2 to 3 mm. is preferably employed in the present invention. In case of employing urea in the form of flake, the urea is added to an aqueous solution of phosphoric acid maintained preferably at a temperature of 50° to 60° C. and is dissolved at that temperature, since the dissolution rate is about 0.5 to about 0.2 time that of the granular urea and when the addition is conducted at a higher temperature, the condensation reaction proceeds heterogeneously and the degree of condensation of the obtained condensed ammonium phosphate is not uniform. Use of an aqueous solution of urea is undesirable in the present invention. For instance, in case of employing a 40% to 50% by weight aqueous solution of urea, the temperature of the heated aqueous solution of phosphoric acid is suddenly lowered by the addition of the aqueous solution of urea and also the reaction rate becomes late, because of a large excess of water. In that case, the reaction rate is about 0.5 to 0.7 time that of the case using a granular urea. Therefore, since the reaction efficiency is lowered due to large excess of water, the degree of condensation of the obtained condensed ammonium phosphate is not uniform and a portion of the condensed ammonium phosphate having a degree of condensation of less than 20 and the unreacted urea are increased.

After adding to an aqueous solution of phosphoric acid, the temperature of the aqueous solution is raised to 110° to 125° C., usually 115° to 125° C. to start the condensation and the heating is then stopped. When the temperature is raised to a temperature higher than 125° C., the condensation reaction rapidly proceeds, and in the successive reaction under heat of reaction after stopping the heating, the temperature rises too high so that condensed ammonium phosphate having a uniform degree of condensation cannot be obtained. In general, since the production of high condensed ammonium phosphate is increased and moreover the urea compounds are not produced in desired amounts, a large quantity of a water-insoluble portion is produced. The minimum temperature necessary to make the condensation reaction proceed varies depending on the concentration of an aqueous solution of phosphoric acid. In case of employing a 75% to 85% by weight aqueous solution of phosphoric acid, the aqueous solution is usually heated to a temperature of 115° to 125° C. In case of an aqueous solution of phosphoric acid in concentrations higher than 85% by weight, the aqueous solution is preferably heated to a temperature of 110° to 115° C., since the reaction is vigrous and the heat of reaction becomes large.

After stopping the heating, the reaction is continued by only heat of reaction. The temperature of the reaction system gradually rises, and a first peak of the temperature ranging from about 140° to about 150° appears, though the temperature peak varies to some extent depending on the volume of the reaction system. Thereafter, the temperature of the reaction system drops to 120° to 130° C. and again rises, and a second peak of the temperature ranging from about 140° to about 150° C. appears. In the present invention, it is desirable to select the conditions of the reaction proceeding the reaction under heat of reaction so that the two temperature peaks appear at a temperature of 140° to 150° C. The product having a degree of condensation of less than 20 is increased when the peaks appear at a temperature lower than 140° C., and the product having a degree of condensation of more than 60 is increased when the peaks appear at a temperature higher than 150° C. Also, when the peaks does not fall within the range of 140° to 150° C., the urea compounds are not produced in desired amounts and a water-insoluble portion is increased.

Also, when the reaction temperature under heat of reaction rises too high, the temperature of the reaction system may be controlled, for instance, by cooling a reaction vessel so that the first and second temperature peaks fall within the range of 140° to 150° C.

After the lapse of 3 to 15 minutes, preferably 5 to 10 minutes from the appearance of the second peak of temperature, the reaction is stopped. The reaction is usually stopped by adding water to the reaction system. When the reaction is continued for more than 15 minutes after the appearance of the second peak, the degree of condensation of the product becomes ununiform and also the condensed ammonium phosphate having a degree of condensation of more than 60 is increased. When the reaction is stopped immediately after the appearance of the second peak, the degree of condensation of the product tends to become low and ununiform.

In order to produce the high condensed ammonium phosphate having an average degree of condensation of 20 to 60 and simultaneously to by-produce the urea compounds in particular proportions, urea is employed in an amount of 2 to 4 moles per mole of phosphoric acid. When the amount of urea is less than the above range, the degree of condensation of the obtained condensed ammonium phosphate is low, and also since the amount of the produced urea compounds is decreased, the solubility in water of the condensed ammonium phosphate is decreased. When the amount of urea is more than the above range, since the urea compounds are produced in excess or are not produced in desired proportions, the solubility in water of the high condensed ammonium phosphate is lowered. Moreover, since the degree of condensation of the product is not uniform and is relatively high as a whole, a large portion of the product remains undissolved in water.

The reaction mixture in the form of an aqueous solution may be employed as it is as a flame retarder, or further may be subjected to evaporation to dryness to provide a solid flame retarder. The solid flame retarder can be dissolved in water again.

The thus produced flame retarder of the present invention contains the high condensed ammonium phosphate and the urea compounds in a ratio by weight of 5 to 70 of the whole urea compounds to 100 of the high condensed ammonium phosphate. Also the by-produced urea compounds are a mixture of 8 to 15% by weight of the unreacted urea, 50 to 70% by weight of biuret, 20 to 30% by weight of triuret and 0.5 to 3% by weight of cyanuric acid.

The water-soluble flame retarder of the present invention may also be prepared by adding urea to an aqueous solution of a condensed ammonium phosphate or a mixture of a condensed ammonium phosphate and water, and then maintaining the temperature at about 130° to about 140° C. At this temperature, biuret and triuret are produced after water evaporates. In the course of the production of biuret and triuret, the condensation of the employed condensed ammonium phosphate takes place to produce a condensed ammonium phosphate having a higher degree of condensation than the employed condensed ammonium phosphate. Therefore, a low condensed ammonium phosphate, especially a water-soluble low condensed ammonium phosphate having a degree of condensation of 1 to 4 is preferably employed as a starting material, because a completely water-soluble flame retarder cannot be obtained when a high condensed ammonium phosphate is employed as a starting material.

According to the present invention, the water solubility of the high condensed ammonium phosphate having an average degree of condensation of 20 to 30 is increased from 5% to 6% for a case where the urea compounds are not present to 40% to 60%, when the urea compounds mixture is present in an amount of 5 to 20 parts, preferably 10 to 20 parts by weight based on 100 parts by weight of the high condensed ammonium phosphate. Also, the water solubility of the high condensed ammonium phosphate having an average degree of condensation of 30 to 60 is increased from 0.1% to 0.3% for a case where the urea compounds are not present to 20% to 30%, when the urea compounds mixture is present in an amount of 20 to 70 parts, preferably 20 to 50 parts by weight based on 100 parts by weight of the high condensed ammonium phosphate. Although the water solubility shown herein is one measured at ordinary temperature (about 20° C.), the water solubility of the high condensed ammonium phosphate obtained according to the present invention is good in the presence of adequate amounts of the urea compound even at a low temperature of −5° to −20° C. and no precipitation of the high condensed ammonium phosphate is observed.

According to the process of the present invention, the high condensed ammonium phosphate can be easily prepared in the form of an aqueous solution of high concentration by a simplified process and apparatus as compared with conventional processes and apparatuses, and also since the high condensed ammonium phosphate which is an effective component of the flame retarder of the invention is provided in the form of an aqueous solution of high concentration, the treatment for imparting the flame retardancy to paper, corrugated cardboard, fiber-board, plywood, felt and fiber can be easily conducted.

The flame retarder of the present invention is usually employed in the form of an aqueous solution, the total solid content of which is usually from 10% to 50% by weight. The pH of the aqueous solution is from 6.2 to 7.8 at 20° C. regardless of the concentration of the high condensed ammonium phosphate, and the toxicity of the aqueous solution is very low, for instance, $LD_{50}$ for a 40% aqueous solution of the flame retarder of the invention administered orally is 12,900 mg./kg. Therefore, the flame retarder of the invention can be easily and safely handled in flame retarding treatment.

An aqueous solution of the flame retarder of the invention can be prepared in concentrations of 1% to 60% by weight, but is desirably prepared in concentrations of 10% to 50% by weight with taking the temperature change in the seasons into consideration.

The present invention is more particularly described and explained by means of the following Examples and Comparative Examples, in which all % are by weight unless otherwise noted.

EXAMPLE 1

A stainless steel reaction vessel was charged with a 85% aqueous solution of phosphoric acid in an amount of 1,000 moles of phosphoric acid. The aqueous solution was heated to 98° C. with agitation at a speed of about 150 r.p.m. and thereto was added 4,000 moles of granular urea over 10 to 15 minutes. After the addition of urea, the aqueous solution was further heated to 120° C. When the temperature reached 120° C., the heating was stopped and the reaction was further continued. The temperature of the reaction system rose suddenly, and after reaching a temperature of 148° C., dropped gradually to 132° C. Thereafter, the temperature of the reaction system rose again, and after reaching a temperature of 147° C., began to drop. After the lapse of 10 minutes from this appearance of the second temperature peak of 147° C., the reaction was stopped by adding 25,000 moles of water to the reaction system over 10 minutes. The reaction mixture was further agitated for about 30 minutes to give a colorless, transparent aqueous solution of high condensed ammonium phosphate.

EXAMPLE 2

A stainless steel reaction vessel was charged with a 85% aqueous solution of phosphoric acid in an amount of 1,000 moles. The aqueous solution was heated to 60° C. with agitation and thereto was added 2,000 moles of granular urea over 7 to 10 minutes. After the addition of urea, the aqueous solution was further heated to 120° C. When the temperature reached 120° C., the heating was stopped and the reaction was further continued. The temperature of the reaction system rose suddenly to 145° C. and then gradually dropped to 134° C. Thereafter, the temperature of the reaction system rose again, and after reaching a temperature of 146° C., began to drop. After the lapse of 10 minutes from the appearance of the second temperature peak of 146° C., the reaction was stopped by adding 13,000 moles of water to the reaction system over 5 minutes. The reaction mixture was further agitated for about 15 minutes to give a colorless, transparent aqueous solution of high condensed ammonium phosphate.

EXAMPLE 3

A stainless steel reaction vessel was charged with a 75% aqueous solution of phosphoric acid in an amount of 1,000 moles of phosphoric acid. The aqueous solution was heated to 96° C. with agitation and thereto was added 4,000 moles of granular urea over 10 to 15 minutes. After the addition of urea, the aqueous solution was further heated to 120° C. When the temperature reached 120° C., the heating was stopped and the reaction was further continued. The temperature of the reaction system rose suddenly to 146° C. and then gradually dropped to 130° C. Thereafter, the temperature of the reaction system rose again, and after reaching a temperature of 146° C., began to drop. After the lapse of 10 minutes from the appearance of the second temperature peak of 146° C., the reaction was stopped by adding 25,000 moles of water to the reaction system over 10 minutes. The reaction mixture was further agitated for about 30 minutes to give a colorless, transparent aqueous solution of high condensed ammonium phosphate.

EXAMPLE 4

A stainless steel reaction vessel was charged with a 95% aqueous solution of phosphoric acid in an amount of 1,000 moles of phosphoric acid. The aqueous solution was heated to 98° C. with agitation and thereto was added 4,000 moles of granular urea over 10 to 15 minutes. After the addition of urea, the aqueous solution was further heated to 120° C. When the temperature reached 120° C., the heating was stopped and the reaction was further continued. The temperature of the reaction system rose suddenly, and when the temperature exceeded 140° C., the reaction vessel was cooled so that the temperature did not exceed 150° C. Thereafter, the temperature gradually dropped to 137° C., and rose again. When the temperature exceeded 140° C., it was again controlled by cooling the reaction vessel not so as to exceed 150° C. After conducting this second temperature control for 6 minutes, the reaction was stopped by adding 25,000 moles of water to the reaction system over 10 minutes. The reaction mixture was further agitated for about 30 minutes to give a colorless, transparent aqueous solution of high condensed ammonium phosphate.

EXAMPLE 5

A stainless steel reaction vessel was charged with a 95% aqueous solution of phosphoric acid in an amount of 1,000 moles of phosphoric acid. The aqueous solution was heated to 80° C. with agitation and thereto was added 2,000 moles of granular urea over 7 to 10 minutes. After the completion of the addition of urea, the reaction was continued in the same manner as in Example 4, and the reaction was stopped by adding 13,000 moles of water to the reaction system over 5 minutes. The reaction mixture was further agitated for about 15 minutes to give a colorless, transparent aqueous solution of high condensed ammonium phosphate.

EXAMPLE 6

A stainless steel reaction vessel was charged with a 85% aqueous solution of phosphoric acid in an amount of 1,000 moles of phosphoric acid. The aqueous solution was heated to 60° C. with agitation at a speed of about 600 r.p.m. which was 4 times the agitation speed in Example 1, and thereto was added 4,000 moles of urea in the form of flake over about 30 minutes. After the completion of the addition of urea, the agitation was continued until the urea was completely dissolved in the aqueous solution. The temperature of the reaction system was then elevated to 120° C., and when it reached 120° C., the heating was stopped. The agitation speed was decreased to about 150 r.p.m. and the reaction was further continued under heat of reaction. The temperature of the reaction system rose suddenly to 147° C. and then gradually dropped to 133° C. Thereafter, the temperature of the reaction system rose again, and after reaching 145° C., began to drop. After the lapse of 10 minutes from the appearance of the second temperature peak of 145° C., the reaction was stopped by adding 25,000 moles of water to the reaction system over 10 minutes. The reaction mixture was further agitated for about 30 minutes to give a colorless, transparent aqueous solution of high condensed ammonium phosphate.

EXAMPLE 7

A stainless steel reaction vessel was charged with a 95% aqueous solution of phosphoric acid in an amount of 1,000 moles of phosphoric acid. The aqueous solution was heated to 60° C. with agitation at a speed of about 600 r.p.m., and thereto was added 2,000 moles of urea in the form of flake over about 30 minutes. After the completion of the addition of urea, the temperature of the reaction system was elevated to 98° C., and at that temperature the agitation was further continued until the urea was completely dissolved in the aqueous solution of phosphoric acid. The aqueous solution was then heated, and when the temperature reached 120° C., the heating was stopped. The agitation speed was decreased to about 150 r.p.m. and the reaction was further continued under heat of reaction. The temperature of the reaction system rose suddenly, and when the temperature exceeded 140° C., the reaction vessel was cooled so that the temperature did not exceed 150° C. Thereafter, the temperature of the reaction system gradually dropped to 135° C., and rose again. When the temperature exceeded 140° C., it was again controlled by cooling the reaction vessel not so as to exceed 150° C. After conducting this second temperature control for 6 minutes, the reaction was stopped by adding 13,000 moles of water to the reaction system over 5 minutes. The reaction mixture was further agitated for about 30 minutes to give a colorless, transparent aqueous solution of high condensed ammonium phosphate.

EXAMPLE 8

A stainless steel reaction vessel was charged with a 75% aqueous solution of phosphoric acid in an amount of 10,000 moles of phosphoric acid. The aqueous solution was heated to 98° C. with agitation at a speed of about 150 r.p.m., and thereto was added 40,000 moles of granular urea over 30 to 40 minutes. After the addition of urea, the aqueous solution was further heated, and when the temperature reached 120° C., the heating was stopped and thereafter the reaction was continued in the same manner as in Example 4 where the temperature control was conducted so that the temperature peaks did not exceed 150° C. The reaction was stopped by adding 250,000 moles of water to give a colorless, transparent aqueous solution of high condensed ammonium phosphate.

EXAMPLE 9

The procedure of Example 1 was repeated except that after the lapse of 5 minutes from the appearance of the second temperature peak, the resulting high viscous slurry was introduced into a rapid cooling apparatus to give the reaction product in the form of solid. The reaction product was taken out and was pulverized to give fine powder. The physical properties of the powder were then measured and were as follows:
  True specific gravity: 1.56
  Hygroscopicity: 5.1% (at 20° C., 90% RH for 24 hours)
  Water-solubility: 48.5 g./100 g. water (at 20° C.)
  Nitrogen content: 42.4%
  Phosphorus content: 25.7% (calculated as $P_2O_5$)

Comparative Example 1

A stainless steel reaction vessel was charged with a 95% aqueous solution of phosphoric acid in an amount of 1,000 moles of phosphoric acid. The aqueous solution was heated to 98° C. with agitation and thereto was added 4,000 moles of granular urea over 10 to 15 minutes. After the addition of urea, the aqueous solution was further heated to 120° C. When the temperature reached 120° C., the heating was stopped and the reaction was further continued. The temperature of the reaction system rose suddenly to 168° C. and then gradually dropped to 157° C. Thereafter, the temperature of the reaction system rose again, and after reaching a temperature of 172° C., began to drop. After the lapse of 10 minutes from the appearance of the second temperature peak of 172° C., the reaction was stopped by adding 25,000 moles of water to the reaction system over 10 minutes. The reaction mixture was further agitated for about 30 minutes. The thus obtained reaction mixture was a cloudy aqueous liquor of high condensed ammonium phosphate containing a water-insoluble material.

Comparative Example 2

A stainless steel reaction vessel was charged with a 60% aqueous solution of phosphoric acid in an amount of 1,000 moles of phosphoric acid. The aqueous solution was heated to 98° C. with agitation and thereto was added 4,000 moles of granular urea over 10 to 15 minutes. After the addition of urea, the aqueous solution was further heated to 120° C. When the temperature reached 120° C., the heating was stopped and the reaction was further continued. The temperature of the reaction system rose suddenly to 131° C. and then gradually dropped to 122° C. Thereafter, the temperature of the reaction system rose again, and after reaching a temperature of 133° C., began to drop. After the lapse of 10 minutes from the appearance of the second temperature peak of 133° C., the reaction was stopped by adding 25,000 moles of water to the reaction system over 10 minutes. The reaction mixture was further agitated to give a colorless, transparent aqueous solution of condensed ammonium phosphate.

Comparative Example 3

The reaction was carried out in the same manner as in Example 1 except that a 50% aqueous solution of urea was employed instead of granular urea.

The first and second temperature peaks of the reaction system were 139° C. and 141° C., respectively.

Comparative Example 4

The reaction was carried out in the same manner as in Example 2 except that the granular urea was employed in an amount of 1,000 moles to 1,000 moles of phosphoric acid.

The first and second temperature peaks of the reaction system were 143° C. and 145° C., respectively. The reaction mixture was obtained in the form of an aqueous liquor in which a part of the produced high condensed ammonium phosphate remained undissolved in water.

Comparative Example 5

The reaction was carried out in the same manner as in Example 1 except that the granular urea was employed in an amount of 5,000 moles to 1,000 moles of phosphoric acid.

The first and second temperature peaks of the reaction system were 153° C. and 159° C., respectively. The reaction mixture obtained was a cloudy aqueous liquor in which a large portion of the produced high condensed ammonium phosphate remained undissolved in water.

Comparative Example 6

A stainless steel reaction vessel was charged with a 85% aqueous solution of phosphoric acid in an amount of 1,000 moles of phosphoric acid, and after raising the temperature to 40° C., 4,000 moles of granular urea was added to the aqueous solution over 10 to 15 minutes.

No dissolution of urea was observed. The urea agglomerated in the vessel and a stirrer came to a standstill.

Comparative Example 7

The reaction was carried out in the same manner as in Example 1 except that the granular urea was added to the aqueous solution of phosphoric acid maintained at 110° C.

The first and second temperature peaks of the reaction system were 171° C. and 176° C., respectively. The reaction mixture obtained was a cloudy aqueous liquor in which a large portion of the produced high condensed ammonium phosphate remained undissolved in water.

Comparative Example 8

The reaction was carried out in the same manner as in Example 1 except that the heating was stopped at 130° C.

The first and second temperature peaks of the reaction system were 185° C. and 194° C., respectively. The reaction mixture was obtained in the form of slurry in which a large portion of the produced high condensed ammonium phosphate was present undissolved in water.

There are shown in the following Table 1 the results of the measurements of solid content of the obtained aqueous solutions or liquors, degree of condensation of the produced condensed ammonium phosphates, content of each of the produced urea compounds and proportion of high condensed ammonium phosphate dissolved in water in the produced high condensed ammonium phosphate having a degree of condensation of not less than 20, with respect to the products obtained in Examples 1 to 9 and Comparative Examples 1 to 8.

The results are shown in Table 2 in which the values show the amount (g.) of solid material to 100 g. of water.

TABLE 2

|  | −20° C. | 0° C. | 10° C. | 20° C. | 30° C. | 40° C. |
|---|---|---|---|---|---|---|
| Example 1 | 12 | 42 | 48 | 55 | 59 | 69 |
| Example 2 | 41 | 49 | 52 | 59 | 63 | 78 |

Test 2

The flame retarding effect of the flame retarder of the present invention was estimated as follows:

The reaction mixtures in the form of an aqueous solution or liquor obtained in Examples 1 to 3 and Comparative Examples 1 to 5, 7 and 8 were employed as flame retarders. The content of condensed ammonium phosphate was adjusted to 15%. A kraft paper having a basis weight of 81.5 g./m.$^2$ was then impregnated with the thus prepared liquid flame retarder and dried at 90° C. for 10 minutes. The flammability test of the thus treated kraft paper was conducted by 45° micro burner method according to Japanese Industrial Standard (hereinafter referred to as "JIS") L 1091. The flame retardancy was estimated according to the following classification shown in Table 3.

TABLE 3

| | Carbonized area | Flaming | Glowing | Carbonization distance |
|---|---|---|---|---|

TABLE

| | Total solid content % | Condensed ammonium phosphate | | | | Urea compounds | | | | | Proportion of condensation product dissolved in water % |
|---|---|---|---|---|---|---|---|---|---|---|---|---|
| | | Total content | Degree of condensation | | | Total content | Urea | Biuret | Triuret | Cyanuric acid | |
| | | | <20 | 20–30 % | 30–60 | >60 | | | % | | | |
| Ex. 1 | 42.5 | 28.5 | 0.3 | 1.4 | 26.4 | 0.4 | 14.0 | 1.2 | 8.8 | 3.9 | 0.1 | 99 |
| Ex. 2 | 41.8 | 37.1 | 0.9 | 34.2 | 1.8 | 0.2 | 4.7 | 0.5 | 3.1 | 1.0 | 0.1 | 87 |
| Ex. 3 | 42.1 | 27.6 | 0.2 | 1.8 | 25.3 | 0.3 | 13.5 | 1.4 | 8.0 | 4.0 | 0.1 | 98 |
| Ex. 4 | 41.0 | 27.8 | 0.3 | 1.7 | 25.6 | 0.2 | 13.2 | 0.7 | 9.1 | 3.3 | 0.1 | 97 |
| Ex. 5 | 40.3 | 36.5 | 0.7 | 31.4 | 4.2 | 0.2 | 3.8 | 0.2 | 2.9 | 0.6 | 0.1 | 90 |
| Ex. 6 | 41.5 | 28.2 | 0.3 | 1.6 | 26.0 | 0.3 | 13.3 | 0.8 | 9.0 | 3.4 | 0.1 | 92 |
| Ex. 7 | 40.7 | 36.7 | 0.8 | 30.6 | 5.1 | 0.2 | 4.0 | 0.3 | 3.1 | 0.5 | 0.1 | 90 |
| Ex. 8 | 41.7 | 28.4 | 0.4 | 1.7 | 25.9 | 0.4 | 13.3 | 0.8 | 9.1 | 3.3 | 0.1 | 96 |
| Ex. 9 | 100.0 | 66.9 | 0.7 | 3.3 | 62.0 | 0.9 | 33.1 | 2.8 | 20.7 | 9.5 | 0.1 | 94 |
| Com. Ex. 1 | 39.2 | 25.1 | 0.1 | 0.5 | 4.9 | 19.6 | 14.1 | 0.0 | 1.3 | 6.5 | 6.3 | 91 |
| Com. Ex. 2 | 44.3 | 27.2 | 26.0 | 1.1 | 0.1 | 0.0 | 17.1 | 10.5 | 4.7 | 1.8 | 0.1 | <5 |
| Com. Ex. 3 | 41.6 | 24.2 | 21.0 | 2.1 | 1.1 | 0.0 | 17.4 | 10.7 | 5.3 | 1.3 | 0.1 | 97 |
| Com. Ex. 4 | 29.7 | 28.4 | 1.5 | 17.2 | 6.6 | 2.5 | 1.3 | 0.1 | 0.3 | 0.6 | 0.3 | 72 |
| Com. Ex. 5 | 46.3 | 27.5 | 1.2 | 4.5 | 18.9 | 2.9 | 18.8 | 0.9 | 7.6 | 6.3 | 4.0 | <5 |
| Com. Ex. 6 | (Reaction was impossible.) | | | | | | | | | | | |
| Com. Ex. 7 | 40.8 | 28.3 | 0.1 | 0.9 | 23.7 | 3.6 | 12.5 | 0.9 | 3.5 | 3.8 | 4.3 | 47 |
| Com. Ex. 8 | 38.4 | 27.7 | 0.2 | 0.7 | 18.5 | 8.3 | 10.7 | 0.3 | 2.6 | 3.2 | 4.6 | <5 |

Test 1

The solubility in water of the flame retarder of the present invention was measured as follows:

The reaction mixtures in the form of an aqueous solution obtained in Examples 1 and 2 were subjected to evaporation to dryness to give solid materials which were mixtures of high condensed ammonium phosphate and urea compounds. By employing the thus obtained solid materials, the solubilities in water at various temperatures were measured.

| | cm$^2$ | sec. | sec. | cm. |
|---|---|---|---|---|
| ○ | ≦30 | ≦3 | ≦5 | ≦20 |
| △ | ≦45 | ≦3 | ≦5 | >20 |
| X | >45 | >3 | >5 | >20 |

The results of measurements of the condensed ammonium phosphate content of the treated kraft paper and the flame retardancy are shown in Table 4.

TABLE 4

| Flame retarder | Condensed ammonium phosphate content (g./m².) | Flame retardancy |
| --- | --- | --- |
| Example 1 | 18.2 | ○ |
| Example 2 | 18.3 | ○ |
| Example 3 | 18.1 | ○ |
| Com. Ex. 1 | 18.2 | Δ |
| Com. Ex. 2 | 18.2 | X |
| Com. Ex. 3 | 18.3 | Δ |
| Com. Ex. 4 | 18.3 | Δ |
| Com. Ex. 5 | 18.1 | X |
| Com. Ex. 7 | 18.4 | X |
| Com. Ex. 8 | 18.3 | X |

Test 3

The flame retarding effect of the flame retarder of the present invention was estimated as follows:

The reaction mixtures in the form of an aqueous solution or liquor obtained in Examples 1 to 3 and Comparative Examples 1 to 5, 7 and 8 were employed as flame retarders. The content of condensed ammonium phosphate was adjusted to about 25%, and a plywood having a thickness of 9 mm. (second class plywood of lauan) was impregnated with the thus prepared liquid flame retarder under reduced pressure. The plywood was then dried at 60° C. for 12 hours and was allowed to stand in a desiccator for 24 hours. The incombustibility test of the thus treated plywood was conducted according to JIS A 1321 and the third class incombustibility was estimated.

The condensed ammonium phosphate contents in the liquid flame retarders, the condensed ammonium phosphate contents of the treated plywoods and the results of the third class incombustibility test are shown in Table 5.

TABLE 5

| Flame retarder | Condensed ammonium phosphate content in liquid flame retarder % | Condensed ammonium phosphate content in plywood % | third class incombustibility |
| --- | --- | --- | --- |
| Example 1 | 24.9 | 16.1 | pass |
| Example 2 | 24.8 | 15.9 | pass |
| Example 3 | 25.2 | 16.3 | pass |
| Com. Ex. 1 | 25.0 | 16.4 | failure |
| Com. Ex. 2 | 24.9 | 15.8 | failure |
| Com. Ex. 3 | 25.1 | 16.2 | failure |
| Com. Ex. 4 | 24.9 | 15.9 | failure |
| Com. Ex. 5 | 25.2 | 16.1 | failure |
| Com. Ex. 7 | 24.8 | 16.4 | failure |
| Com. Ex. 8 | 25.3 | 16.3 | failure |

Test 4

The flame retarding effect of the flame retarder of the present invention was estimated as follows:

The reaction mixtures in the form of an aqueous solution or liquor obtained in Examples 1 to 3 and Comparative Examples 1 to 5, 7 and 8 were employed as flame retarders. The content of condensed ammonium phosphate was adjusted to about 25%. The thus prepared liquid flame retarder was added to an emulsion of an acrylic resin having a solid content of 50% (commercially available under the tradename of "Polysol F-360" made by Showa Kobunshi Kabushiki Kaisha) in an amount of 30 parts by weight to 100 parts by weight of the emulsion, and the mixture was agitated by a homogenizer. The mixture was applied to a glass plate, and was dried at 50° C. for 24 hours and then allowed to stand in a desiccator for 7 days to give a film having a thickness of 2 mm. The flammability test of the film was conducted by the oxygen index method according to JIS K 7201.

Also, the compatibility of the liquid flame retarder with the emulsion was observed after allowing the mixture to stand at 20° C. for 24 hours.

The results of the compatibility and the flammability test are shown in Table 6.

TABLE 6

| Flame retarder | Compatibility | Oxygen Index % |
| --- | --- | --- |
| Example 1 | good | 31.3 |
| Example 2 | good | 32.4 |
| Example 3 | good | 30.2 |
| Com. Ex. 1 | gelation; precipitate being observed | 19.5 (ununiform)* |
| Com. Ex. 2 | good | 19.3 |
| Com. Ex. 3 | good | 18.5 |
| Com. Ex. 4 | gelation; precipitate being observed | 19.6 (ununiform)* |
| Com. Ex. 5 | gelation into a mass | — |
| Com. Ex. 7 | gelation into a mass | — |
| Com. Ex. 8 | gelation into a mass | — |

*Ununiformity means that flame retardancy of film is not uniform because of poor dispersibility of flame retarder.

What we claim is:

1. A water-soluble flame retarder comprising (1) a condensed ammonium phosphate having an average degree of condensation of not more than 60 and (2) 5 to 70 parts by weight, based on 100 parts by weight of said condensed ammonium phosphate, of a mixture containing 50% to 70% by weight of biuret and 20% to 30% by weight of triuret based on the weight of the mixture, said mixture being produced from urea in the presence of a condensed ammonium phosphate.

2. The water-soluble flame retarder of claim 1, wherein said condensed ammonium phosphate has an average degree of condensation of 20 to 60.

3. The water-soluble flame retarder of claim 1, which is a condensation product of phosphoric acid and urea.

4. The water-soluble flame retarder of claim 3, wherein said condensation product comprises a condensed ammonium phosphate having an average degree of condensation of 20 to 60 and 5 to 70 parts by weight of, based on 100 parts by weight of said condensed ammonium phosphate, of a mixture of 8% to 15% by weight of urea, 50% to 70% by weight of biuret, 20% to 30% by weight of triuret and 0.5% to 3% by weight of cyanuric acid.

5. The water-soluble flame retarder of claim 1, in which the flame retarder is in the form of an aqueous solution, the total concentration of the condensed ammonium phosphate and the urea compounds being from 10% to 50% by weight.

6. A process for preparing a water-soluble flame retarder which comprises heating an aqueous solution of phosphoric acid to a temperature of 50° to 100° C., adding urea to said aqueous solution, heating said aqueous solution to a temperature of 110° to 125° C., stopping the heating, continuing the reaction under heat of reaction, and stopping the reaction after 3 to 15 minutes from a second appearance of peaks of temperature of the reaction under heat of reaction, the reaction temperature after stopping the heating being maintained so that the first and second peaks of the reaction temperature which appear after stopping the heating fall within the range of 140° to 150° C.

7. The process of claim 6, wherein the concentration of said aqueous solution of phosphoric acid is not less than 75% by weight.

8. The process of claim 6, wherein the concentration of said aqueous solution of phosphoric acid is from 75% to 95% by weight.

9. The process of claim 6, wherein said urea is employed in an amount of 2 to 4 moles per mole of phosphoric acid.

* * * * *